(12) United States Patent
Bratton (10) Patent No.: US 7,099,848 B1
(45) Date of Patent: Aug. 29, 2006

(54) AUDIO DELIVERY AND RENDERING METHOD AND APPARATUS

(75) Inventor: Timothy Robert Bratton, Los Altos, CA (US)

(73) Assignee: Listen.Com, Inc., San Francisco, CA (US)

( * ) Notice: Subject to any disclaimer, the term of this patent is extended or adjusted under 35 U.S.C. 154(b) by 0 days.

(21) Appl. No.: 09/505,486

(22) Filed: Feb. 16, 2000

Related U.S. Application Data (60) Provisional application No. 60/120,717, filed on Feb. 16, 1999.

(51) Int. Cl.
*G06F 17/00* (2006.01)

(52) U.S. Cl. .............................. 705/57; 725/88; 725/89; 725/142; 348/561; 348/210; 345/671

(58) Field of Classification Search .................. 705/57; 348/210; 345/671
See application file for complete search history.

(56) References Cited

U.S. PATENT DOCUMENTS

| | | | | |
|---|---|---|---|---|
| 4,658,093 | A | 4/1987 | Hellman | 380/25 |
| 4,949,187 | A | 8/1990 | Cohen | 358/335 |
| 5,155,591 | A | 10/1992 | Wachob | 358/86 |
| 5,319,455 | A | 6/1994 | Hoarty et al. | 348/7 |
| 5,404,505 | A | 4/1995 | Levinson et al. | 395/600 |
| 5,404,566 | A | 4/1995 | Wehrmeyer | 455/6.3 |
| 5,557,242 | A | 9/1996 | Wetherell | 331/17 |
| 5,557,541 | A | 9/1996 | Schulhof et al. | 365/514 |
| 5,568,181 | A | 10/1996 | Greenwood et al. | 348/7 |
| 5,625,783 | A | 4/1997 | Ezekiel et al. | 395/352 |

(Continued)

FOREIGN PATENT DOCUMENTS

EP  0680214 A2  2/1995

(Continued)

OTHER PUBLICATIONS

Freier A O et al: "The SSL Protocol Version 3.0"; Internet Draft, XX, XX, Nov. 18, 1996, Abstracts, 1-72, XP002923866 the whole document.

(Continued)

*Primary Examiner*—Firmin Backer (57) ABSTRACT

Method and system for audio synthesis of a digital data file representing an assembly of information-bearing sounds in digital form. One or more spaced apart data segments are designated as key blocks and are removed from the original data file. The remainder of the data file is encrypted or otherwise encoded and communicated to a selected recipient on a first channel. Locations, sizes and separation distances of key blocks from each other within the original data file and a selected portion of the encoding or encryption key are placed in a data supplement. The removed segments and data supplement (optional) are communicated to the selected recipient on a second channel and/or at another time. The original data file is recovered by using the data supplement information, or using already available information, decoding or decrypting the encoded or encrypted data file and replacing the removed segments within the data file remainder. Neither the remainder data file nor the removed segments plus data supplement is sufficient, by itself, to allow reproduction of the original data file. Each of the remainder data file and the removed segments plus data supplement can be distributed separately and subsequently combined when authorization or license to reproduce the sounds has been obtained.

35 Claims, 6 Drawing Sheets

U.S. PATENT DOCUMENTS

| | | | | |
|---|---|---|---|---|
| 5,636,276 | A | 6/1997 | Brugger | 380/4 |
| 5,642,417 | A | 6/1997 | Stringer | 380/4 |
| 5,721,950 | A | 2/1998 | Tobagi et al. | 395/826 |
| 5,757,908 | A | 5/1998 | Cooper et al. | 380/4 |
| 5,761,607 | A | 6/1998 | Gudesen | 455/6.2 |
| 5,773,741 | A | 6/1998 | Eller et al. | 84/609 |
| 5,787,399 | A | 7/1998 | Lee et al. | 704/270 |
| 5,819,160 | A | 10/1998 | Foladare et al. | 455/45 |
| 5,826,080 | A | 10/1998 | Dworzecki | 395/673 |
| 5,828,904 | A | 10/1998 | Batson et al. | 395/878 |
| 5,883,955 | A | 3/1999 | Ronning | 380/4 |
| 5,889,860 | A | 3/1999 | Eller et al. | 380/4 |
| 5,892,825 | A | 4/1999 | Mages et al. | 380/3 |
| 5,898,892 | A | 4/1999 | Gulick et al. | 395/872 |
| 5,901,143 | A | 5/1999 | Rotter et al. | |
| 5,931,901 | A | 8/1999 | Wolfe et al. | 709/206 |
| 5,937,164 | A | 8/1999 | Mages et al. | 395/200.48 |
| 5,995,518 | A * | 11/1999 | Burns et al. | 370/503 |
| 6,006,257 | A | 12/1999 | Slezak | 709/219 |
| 6,035,329 | A | 3/2000 | Mages et al. | 709/217 |
| 6,189,098 | B1 * | 2/2001 | Kaliski, Jr. | 713/168 |
| 6,202,056 | B1 | 3/2001 | Nuttall | 705/52 |
| 6,363,257 | B1 * | 3/2002 | Warwick | 455/511 |
| 6,373,831 | B1 * | 4/2002 | Secord et al. | 370/342 |
| 6,374,355 | B1 * | 4/2002 | Patel | 713/168 |
| 6,476,873 | B1 * | 11/2002 | Maeng | 348/561 |
| 2001/0019604 | A1 | 9/2001 | Joyce et al. | 379/114.2 |
| 2001/0034822 | A1 * | 10/2001 | Weinreb et al. | 711/203 |
| 2002/0003881 | A1 * | 1/2002 | Reitmeier et al. | 380/210 |
| 2003/0076893 | A1 * | 4/2003 | Bruekers et al. | 375/295 |
| 2004/0064570 | A1 * | 4/2004 | Tock | 709/228 |
| 2004/0093506 | A1 * | 5/2004 | Grawrock et al. | 713/189 |
| 2005/0188409 | A1 * | 8/2005 | Daniels | 725/88 |

FOREIGN PATENT DOCUMENTS

| | | | |
|---|---|---|---|
| EP | 0798924 A2 | 9/1996 | |
| EP | 0843 449 A2 | 5/1998 | |
| GB | 2 222 057 A | 2/1990 | |
| WO | WO 97/12486 | 3/1997 | |
| WO | WO 98 26559 A | 6/1998 | |
| WO | WO 98 58315 A | 12/1998 | 17/30 |
| WO | WO 01/42900 A2 | 12/2000 | |
| WO | WO 01/10124 A1 | 2/2001 | 7/173 |

OTHER PUBLICATIONS

J.W. Schmidt: "Multimedia Databases"; Software Systems, 'Online! 2000, pp. 1-13, XP002177792 TU Hamburg-Harburg; Retrieved from the Internet: URL:http://www.sts.harburg.de/teaching/ss-01/MMDB/010419-MMDB%20Session%203.pdf> 'retrieved on Sep. 19, 2000, pp. 2-4.

Hirosuke Yamamoto; *On Secret Sharing Communication Systems with Two or Three Channels*; May 1986; ISEE Transactions on Information Theory, vol. IT-32, No. 3, pp. 387-393.

\* cited by examiner

AUDIO DELIVERY AND RENDERING METHOD AND APPARATUS

This application claims benefit of provisional application Ser. No. 60/120,717 filed Feb. 16, 1999.

FIELD OF THE INVENTION

This invention relates to coding and reproduction of audio signals.

BACKGROUND OF THE INVENTION

Digital synthesizers or other electronic systems that create music or other sound can often be utilized as an electronic musical instrument or electronic sound machine. A digital synthesizer is often arranged to accept signals from a musician or operator interface and to produce digital output signals that represent analog signals in the audio frequency range. A digital synthesizer is also frequently arranged to accept pre-recorded sequences of music events in a Musical Instrument Digital Interface (MIDI) format.

A digital output signal from a digital synthesizer can be converted to an analog signal and delivered to equipment, such as a loudspeaker, tape recorder, mixer or other similar device, to reproduce the signals as intelligible sound. The digital synthesizer can be arranged to provide output signals that simulate the sounds of one or more conventional musical instruments. Alternatively, the synthesizer can be arranged to simulate sounds that would be emitted by a theoretical instrument having predetermined audio characteristics that are partly or wholly different from the corresponding characteristics of any convention, known instrument.

For previous synthesizers, synthesis of music and other sounds is a formidable task. A real musical instrument produces a complex blend of many different frequencies and impart what is commonly referred to as "tone color" or "timbre" to the associated sound. For example, a percussion sound made by a drum or cymbal is an aperiodic sound that cannot be fully described by any simple mathematical function. Accordingly, the reproduction or synthesis of digital signals representing sounds as rich and complex as a real musical instrument is a formidable task for digital signal sampling and processing. Ideally, the synthesizer should respond to the nuances of a musician's manipulation of the interface (e.g., a particular musical instrument). For example, a snare drum has many different audio characteristics when played in different locations, such as adjacent to the center of the drum membrane, adjacent to the rim, or on the rim of the drum. Additionally, the audio characteristics of a percussion instrument will vary with the striking force and stylistic inflection of the musician.

By providing a large enough waveform database, more realistic and expressive synthesis of a given group of sounds can be achieved. Many synthesizers relying on waveform sampling technology are used extensively in the music and multimedia fields for their ability to create musical sounds that closely emulate the sound of a musical instrument.

At present, a digital synthesizer system often utilizes a MIDI to control the synthesizer. The MIDI interface creates control signals or other MIDI control data. The MIDI control data may represent a music event, such as occurrence of specific musical notes from a particular musical instrument, such as a piano, drum or horn. However, MDI has some fundamental limitations. For example, a synthesizer that uses a MIDI notation has trouble recreating a human voice.

A conventional synthesizer system utilizes a large solid state memory that stores the digital waveform signals representing each note played on a particular instrument. The memory can be a static random access memory (SRAM), a dynamic random access memory (DRAM), a read only memory (ROM) or some other similar memory with sufficiently rapid response. When a musician actuates a key or other interface device, the appropriate waveform is selected, depending upon the key actuated and upon the intensity and velocity of the key strike. The waveform is then converted into an analog output signal for sound reproduction. A digital waveform signal can be combined with other waveform signals that represent other musical notes being displayed, before the conversion to an analog output signal.

In this arrangement, the synthesizer, in effect, merely plays back digital recordings of individual musical notes or other sounds. Each waveform signal is stored as a collection of individual data words, each representing a single sample of the waveform at a particular time.

A sequencer is a device for editing musical data, such as MIDI events, and converting the musical data into a musical signal in real time. Synthesizers are frequently used together with a computer to play a musical score. In this arrangement, a sequencer reads a MIDI file as an ordered sequence. However, it is generally recognized that MDI files and synthesizers are unable to recreate the nuances in a recording or to capture the background noises of a live audience.

Other prior art systems store only one or a relatively few waveform signals representing each musical instrument. These stored waveforms are then adjusted by digital signal processing or other electronic techniques, such as nonlinear distortion, to reflect the frequency and amplitude changes associated with particular musical characteristics, as indicated by the MIDI control data. For example, the frequency and amplitude of a sample waveform representing middle C on a piano can be adjusted to synthesize a different piano note and volume. However, these synthesizers are unable to (re)produce the complex blends or tone color with high enough fidelity for the musically trained ear.

In another approach, some systems use digital filtering to adjust the harmonic content of a particular note. However, these systems require a large amount of computer power and can be affected by audio quality degradation.

What is needed is an audio synthesizer system that can reliably reproduce all types of sounds, including music and the human voice. Preferably, the system should allow a separation of music or other information-bearing sound into two or more selected components, where no single component allows reproduction of sounds resembling the original sounds. Preferably, the system should allow encryption or other encoding of one or more of the selected components and should allow change of parameters affecting the format of one or more of the components.

SUMMARY OF THE INVENTION

These needs are met by the invention, which provides a system for removing one or more selected segments (referred to collectively as pre-processing components, or PPCs) of a digital signal stream that represents an assembly of information-bearing sounds (ISA), including but not limited to music and one or more human voices, to produce a remainder data file (referred to as a reduced data file, or ISDF), having one or more components, after decimation of the ISA by removal of the PPC(s). The ISDF, as a first sequence, and the assembly of PPCs, as a second sequence are preferably processed differently and communicated using different communication channels. The ISDF is preferably encrypted or otherwise encoded, using an encryption key EK that may be chosen independently or may depend upon information contained in the PPC(s). A data supplement DS, associated with the PPC(s) sequence, contains one or more of the following information items: location of at least one PPC within the original ISA; size of one or more of the PPCs; size of one or more components of the ISDF; separation distance within the ISA of two consecutive PPCs (if two or more are removed); and at least a portion of the encryption key EK. The encrypted version of the ISDF, E(ISDF), is communicated over a first communication channel, and the PPC(s) and the associated data supplement DS are communicated over a second communication channel, which may be arranged as a secure communication channel. Optionally, the PPC(s) and associated data supplement channel may also be encrypted for communication. Optionally, more than one sequence of removed PPCs can be formed, each with an associated data supplement DS, and communicated separately from the remaining ISDF component(s).

The invention allows an assembly of information-bearing sounds ISA, such as music or the sound(s) of one or more human voices, to be disassembled into N+1 complementary sequences (N≧1), where any collection of N+1−k sequences (1≦k≦N), including the ISDF, will not allow reconstruction of an assembly of sounds resembling the original ISA.

One useful application of this invention is the provision of a legally protected ISA (e.g., an ISA covered by copyright) as N+1 sequences, where any collection of N or fewer sequences cannot be used to reproduce the original ISA. The invention would, for example, allow distribution of a subset N+1−k of these N+1 sequences to a prospective authorized listener at one time (e.g., for storage for possible future use) and distribution of the remaining k sequences (1≦k≦N) at another time, when the listener is now authorized to listen to the entire ISA.

Another useful application of the invention is the provision or earlier distribution of a first sequence, representing the bulk or majority of the sounds needed to accurately reproduce the ISA, where the first sequence has certain critical data removed. The second sequence, containing the remainder of the ISA data needed to accurately reproduce the ISA, is distributed using another channel and/or at another, more convenient time.

DESCRIPTION OF BEST MODES OF THE INVENTION

MP3, which refers to Layer 3 of the MPEG1 standard, has been developed and adopted as a useful audio compression standard for music and other assemblies of information-bearing sounds (ISAs). MP3 is discussed in some detail in ISO/IEC 11172-3, an international standards document, incorporated by reference herein. A protocol for creation of an MP3 file is well known to those of ordinary skill in the are of sound compression. Many software programs, such as Audio Catalyst, offered by Xing Technology, which runs on a personal computer, implement creation an MP3 file.

Figure 1:
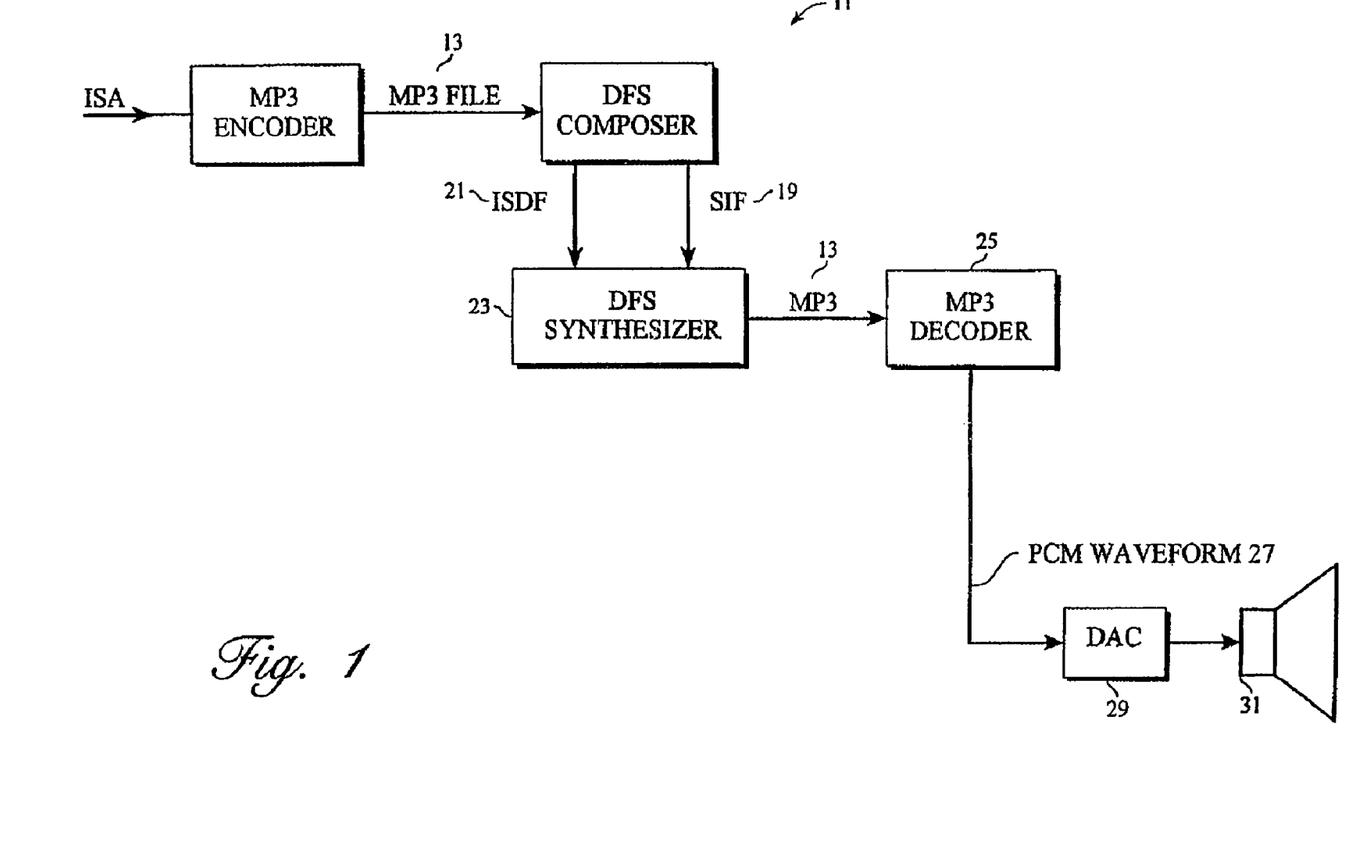
FIG. 1 is a schematic view of apparatus that creates an MP3 file.

FIG. 1 illustrates apparatus 11 that may be used to create an MP3 file 13 from an ISA 15. The ISA 15 is received by a digital file sampling composer (DFSC) 17. The DFSC 17 creates and issues a synthesizer information file (SIF) 19 and an item specific data file (ISDF) 21. For decoding, a DFS synthesizer 23 receives and uses the SIF 19 to provide suitable sequencing for the ISDF 21. The recovered MP3 file 13 is received and decoded by an MP3 decoder 25, which issues a pulse code modulation (PCM) waveform 27. The PCM waveform 27 can be played or otherwise "displayed" through a digital-to-analog converter (DAC) 29, connected to a speaker 31.

Figure 2A:
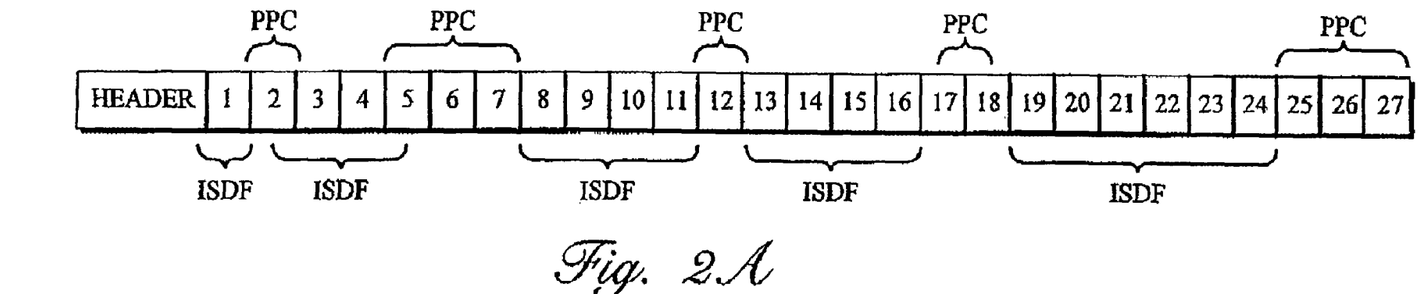
FIGS. 2A–2C illustrate an original ISA, expressed as a digital sequence, and the results of disassembly of the ISA into an ISDF and a sequence of PPCs and of association of a DS with a PPC sequence.
Figure 2B:
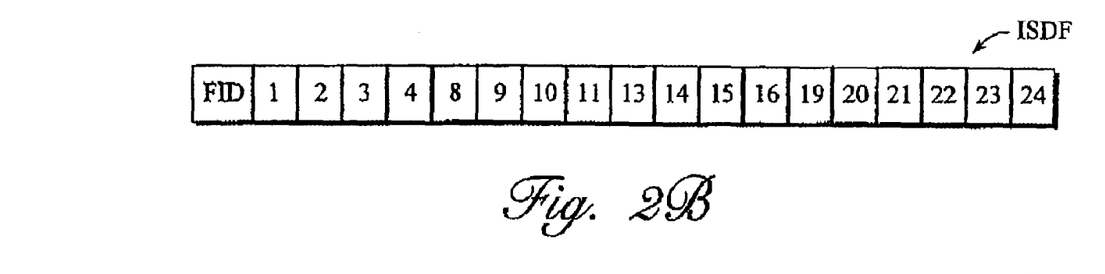
Figure 2C:
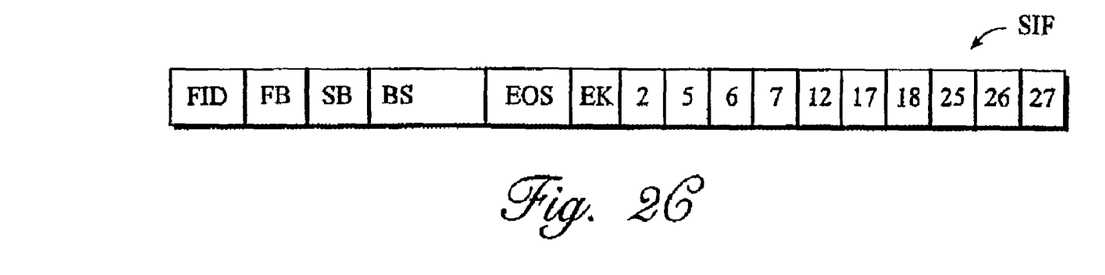

FIGS. 2A–2C illustrate an ISA 15 as an ordered sequence of bits, nibbles, bytes or other information units, numbered n=1, 2, . . . , 27, that are part of an ISA. The ISA (e.g., an MP3 source file) 15 can be any length. A first subset of these information units, namely "2", "5", "6", "7", "12", "17", "18", "26", "27", is removed as a sequence of pre-processing components (PPCs) and is stored in an SIF 19. The remaining data are stored in an ISDF for encryption. In FIG. 2A, the ISA 15 is shown with a 32-bit header (or trailer, if desired), 27 bytes of data and an ID3 tag. The ISDF 21, shown in FIG. 2B, has a file identification (FID) tag and a data field with a selected number of bytes of samples. The SIF 18, shown in FIG. 2C, has an FID field, an ID3 tag, a 32-bit header field, a 2 byte file block (FB) field, a 2 byte song block (SB) field, a variable block size (BS) field, a 1-bit end-of-selection (EOS) flag and at least a portion of an encoding/encryption key (EK). The field block FB specifies the number of blocks of data for the ISDF 21. The song block SB specifies the number of blocks of data to be removed for the SIF 21, preferably using a file stripping algorithm. The block size filed BS specifies the number of bits per block, which may be uniform or may be non-uniform. The EOS flag indicates that the coding process ended on data for the SIF 19 (EOS=1) or ended on data for the ISDF 21 (EOS=0).

Figure 3:
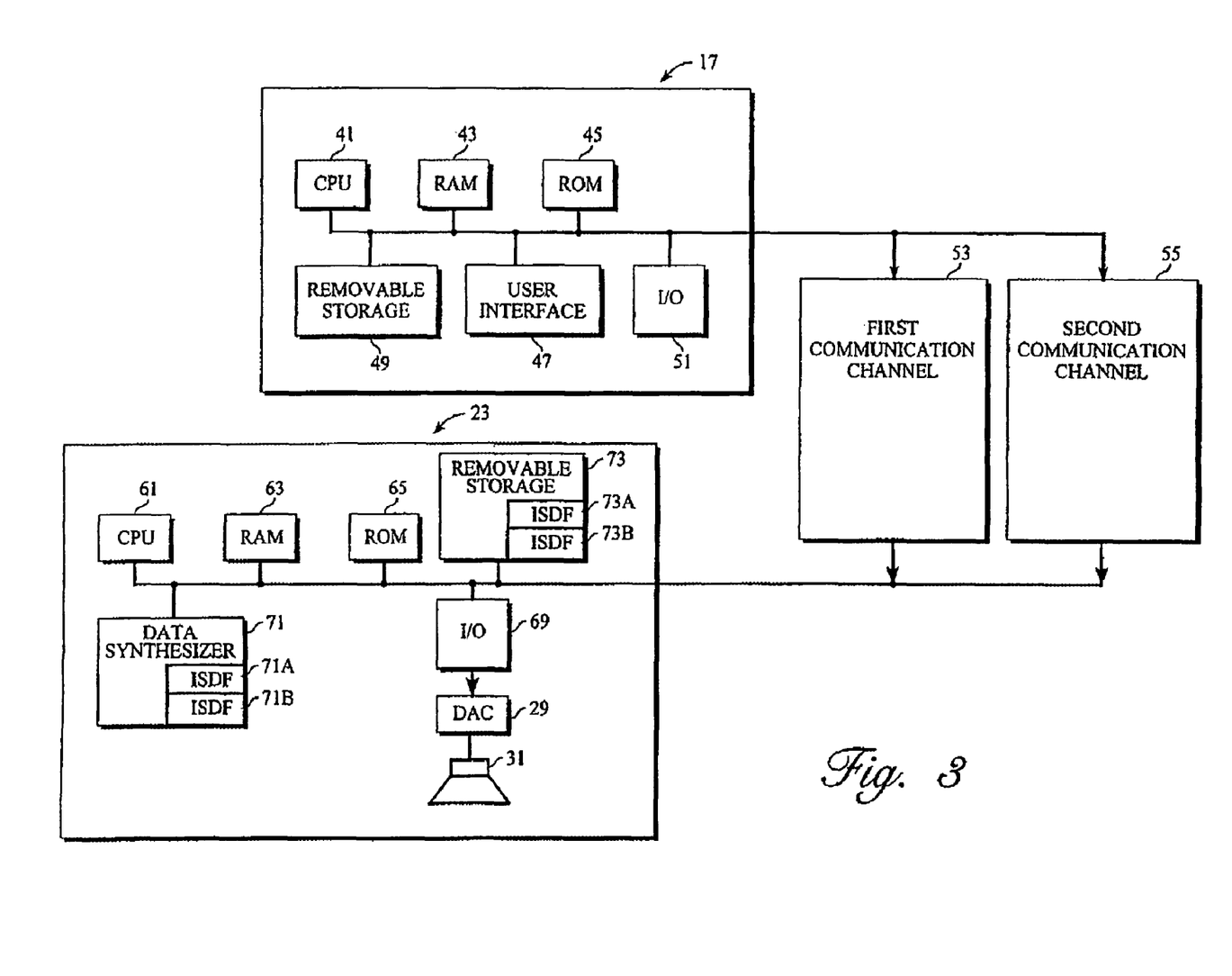
FIG. 3 is a schematic view of a digital file sampling composer and a digital file sampling synthesizer.

FIG. 3 illustrates a DFSC 17, which includes a first CPU 41, a first RAM 43, a first ROM 45, a first user interface 47, a removable storage unit 49, a data I/O module 51, and first and second communication channels, 53 and 55. The first interface 47 may include any or all of a keypad, keyboard, light pen or other data/command entry device, a mouse, and a display module, such as a monitor, LED or LCD device. The first and second channels, 53 and 55, may be the same channel. Alternatively, the first and second channels may be different. For example, the second channel 55 may be a secure channel that offers at least a reasonable degree of protection against unauthorized reception of the signals on the second channel.

FIG. 3 also illustrates a DFSS 23, which includes a second CPU 61, a second RAM 63, a second ROM 65, a second user interface 67, a data I/O module 69, a data synthesizer database 71, a removable storage device 73, and a DAC 75. The data synthesizer database 71 may include an ISDF database 71A and/or an SIF database 71B. The removable storage device 73 may include an ISDF database 73A and/or an SIF database 73B.

Digital samples that are part of the ISDF 21 and/or are part of the SIF 19 may be transferred from the DFS composes 17 to the DFS synthesizer 23 using the first communication channel 53) for ISDF samples) and/or the second communication channel 55 (for SIF samples) and/or may be recorded using the removable storage device 73 and subsequently transferred to the DFS synthesizer 23.

In a preferred embodiment, at least one of the first and second communication channels, 53 and 55, is the Internet. However, any other communication channel(s) can be used to communicate ISDF samples and/or SIF samples, including wireless methods, such as FM subcarrier, CDPD, transmission using the vertical blanking interval of a television signal, and other similar wireless methods.

The ISDF database 71A and the SIF database 71B may include samples from any of several sample sources.

The DFS synthesizer 23 can operate in many different modes, including the following: (1) synthesize an MP3 file from an ISDF database 71A and from SIF samples streamed from the second communication channel 55; (2) synthesize an MP3 file from ISDF samples streamed from the first communication channel 53 and from an SIF database 71B; (3) synthesize an MP3 file from an ISDF database 73A and from SIF samples streamed from the second communication channel 55; and (4) synthesize an MP3 file from an ISDF database 71A and from an SIF database 73B.

Figure 4:
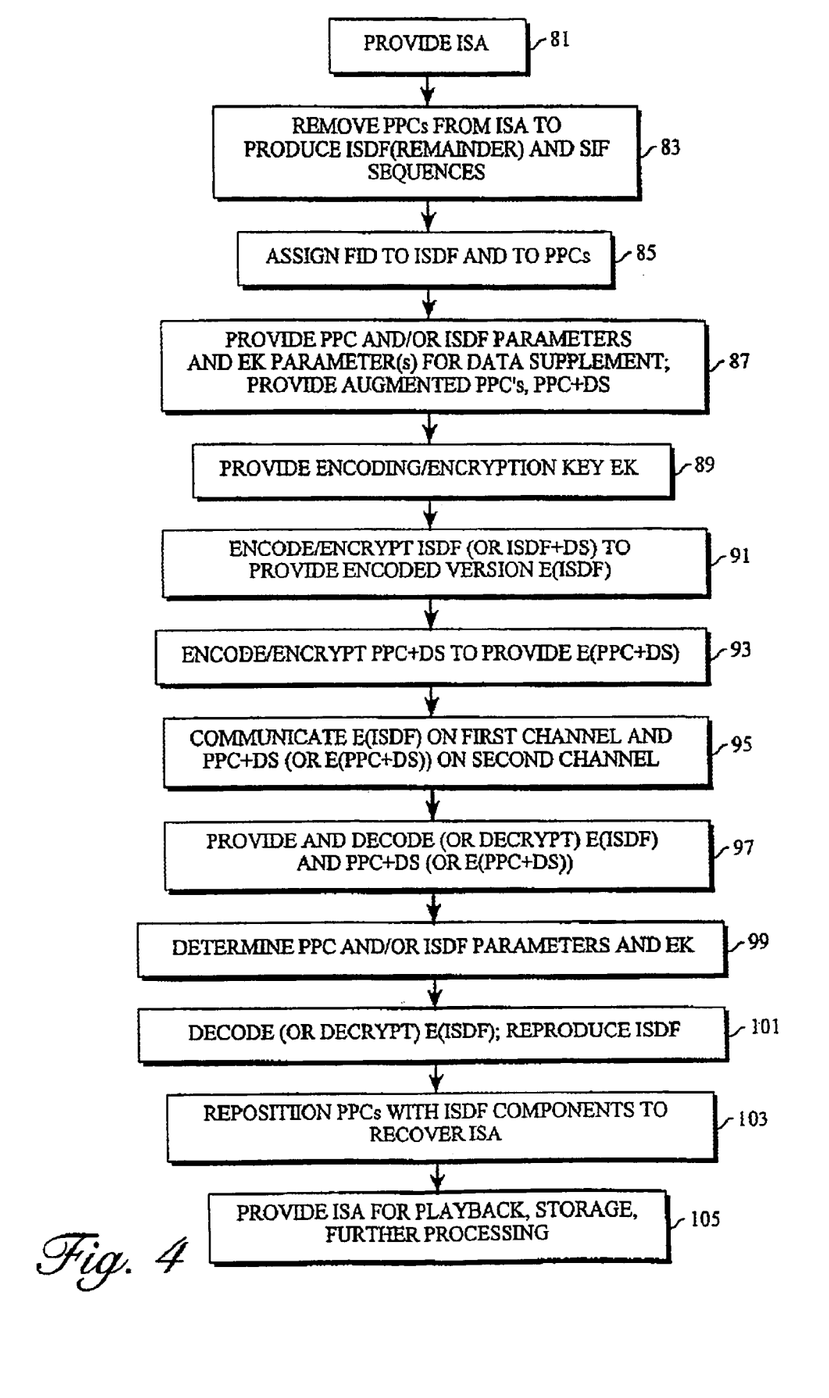
FIGS. 4, 5 and 6 are flow charts illustrating practice of embodiments of the invention.

FIG. 4 is a flow chart illustrating a procedure for practicing audio synthesis according to the invention. In step 81, an ISA including an ordered sequence of units containing digital symbols, is provided. In step 83, the PPCs within the ISA are designated and stripped out or removed from the remainder ISDF of the ISA. In step 85, a file identification number FID is assigned to the PPCs and to the ISDF. In step 87, one or more parameters that characterizes the PPCs and/or the ISDF components is provided and is placed in a data supplement DS that is associated with the PPCs (preferable), to provide an augmented PPC sequence, PPC+DS, and/or with the ISDF. In step 89, an encoding key EK (e.g., an encryption key) is provided, either independently or using one or more parameters provided by one or more components of the PPCs. Normally, the EK will have a fixed encoding procedure but optionally will have one or more parameters that are adjustable according to information supplied by the PPCs or the ISDF. For example, one or more PPCs may provide initial values needed to begin the encoding process. In step 91, the ISDF (or an augmentation ISDF+DS) is encoded (e.g., encrypted), using the encoding key EK, to produce an encoded version E(ISDF). In step 93 (optional; usually not necessary), the augmented PPC sequence, PPC+DS, is also encoded to provide an encoded version E(PPC+DS).

In step 95, the encoded version E(ISDF) is communicated using a first communication channel, and the augmented PPC sequence, PPC+DS, is communicated using a second communication channel. The first and second communication channels may be the same, if desired. Alternatively, the second communication channel may be a secure channel, to protect an non-encoded augmented PPC sequence, PPC+DS, from disclosure to unauthorized entities.

In step 97, the encoded version E(ISDF) and the augmented PPC sequence, PPC+DS (or E(PPC+DS)), are received or otherwise provided, and a decoding (e.g., decryption) process is begun. In step 99, the data supplement DS within the augmented PPC sequence, PPC+DS, is examined, the PPC and/or ISDF parameters are identified, and (optionally) part or all of the encoding key EK is recovered. In step 101, the encoded version E(ISDF) is decoded, to (re)produce the ISDF. In step 103, the PPC components are repositioned among the ISDF components to recover the original ISA. In step 105 (optional), the ISA is provided for an ISA repository for playback, display, storage or further processing.

Optionally, the steps 97–103 may be varied by providing a first of the two sequences, E(ISDF) or PPC+DS, in a first database that is available at one or more locations to any potential user. However, possession of the first sequence, or of the second sequence, along, does not allow the user to reproduce the sounds of the original ISA. Each of the first sequence and the second sequence is a decimated version of the original ISA; and the sounds, if any, reproduced by the first sequence or by the second sequence alone are, preferably, not intelligible. The second sequence is withheld until the user has obtained proper authorization (e.g., a license) to reproduce the sounds of the original ISA. The first sequence may, if desired, represent the majority or bulk of the digital signals needed to reproduce the original ISA so that the remainder (second sequence) requires far less bandwidth or communication capacity for delivery than does the original ISA.

The encoding procedure may, for example, incorporate an encryption process, such as cipher block chaining (CBC), described by Bruce Schneier, *Applied Cryptography*, John Wiley & Sons, Second Edition, 1996, pp. 193–197. In one implementation of CBC, a cleartext block of a selected size is EXclusively ORed (XORed) or EXclusively NORed (XNORed) with a key block and with a preceding ciphertext block to produce a new ciphertext block. The resulting ciphertext block is XORed or XNORed with a next consecutive cleartext block and with the next consecutive key block, and so on until a final encrypted block is generated. The operations XOR and XNOR are each symmetric, commutative, associative and bilinear so that order is not important within the ith step. If Pi, Ci and Ki (i=1, 2, ...) represent cleartext block number i, ciphertext block number i and key block number i, respectively, a CBC procedure can be represented mathematically as $$C(i+1) = Pi\ XNOR\ Ci\ XNOR\ Ki, \tag{1}$$

and the initial ciphertext block (i=1) can be specified by one or more of the PPCs. The choice XNOR, rather than XOR, is made here because of a useful "inversion" relation $$A\ XNOR\ A = I\ \text{(identity)} \tag{2}$$

for any block A of binary symbols. With this approach, preferably, the size of a key block Ki is the same as the size of a cleartext block Pi and is the same as the size of a cipher text block Ci. This constraint can be relaxed somewhat.

When the encrypted message E(ISDF) is received, the process is reversed, beginning with an initial ciphertext block Ci' that is determined using information obtained from that data supplement component(s) received as part of the encrypted message E(ISDF):

$$P(i+1) = C(i+1)'\ XNOR\ Ci'\ XNOR\ Pi. \tag{3}$$

Each of Eqs. (1) and (3) illustrates a sub-encryption cycle (or sub-decryption cycle) for the encryption or decryption process, where an initial ciphertext block is optionally provided by a key block Ki with i=1. Each sub-encryption cycle, set forth as an example in Eq. (1), will have an independently specified key component Ki.

Figure 5:
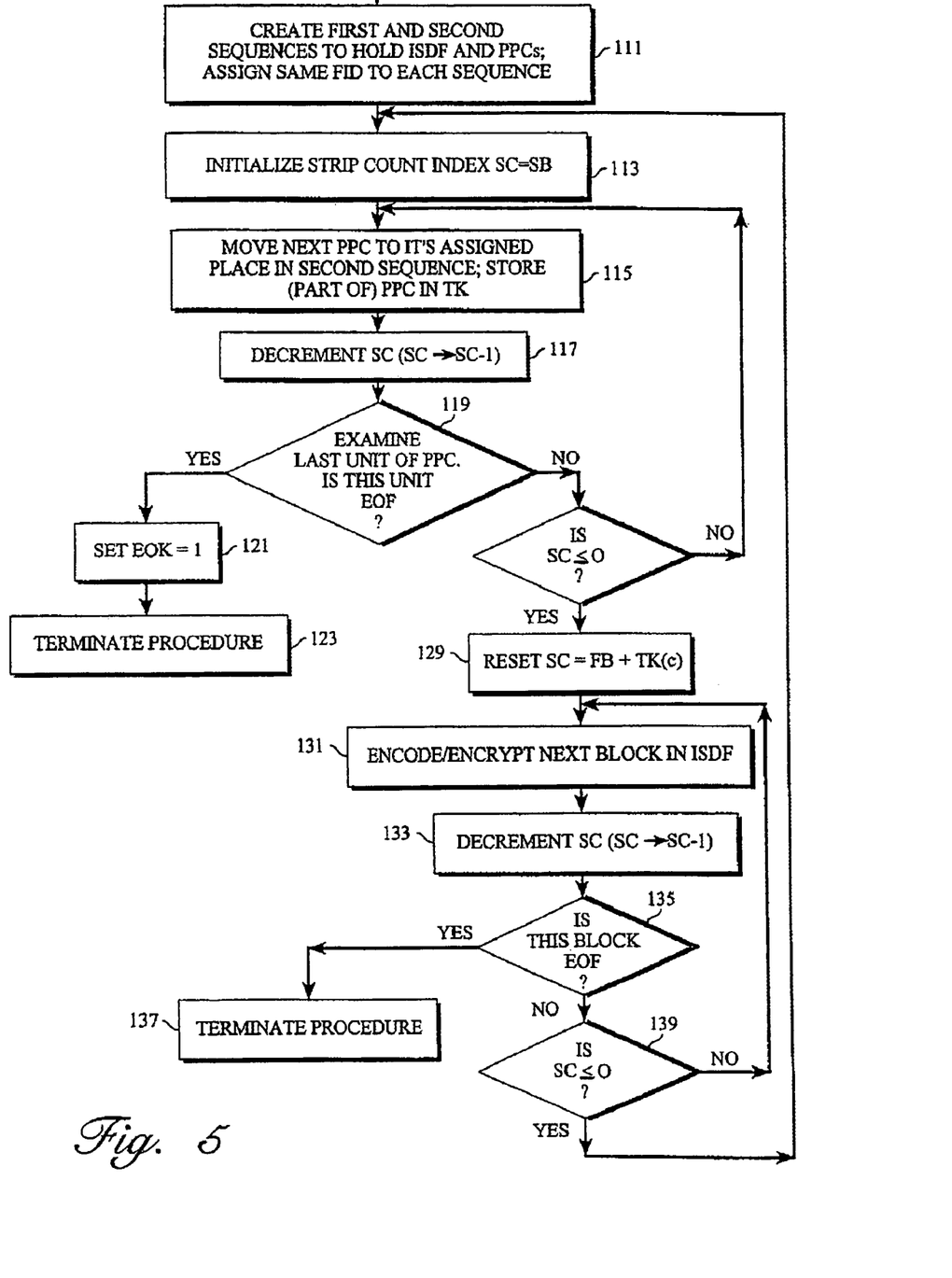

FIG. 5 is a flow chart illustrating a file stripping algorithm that can be applied to an ISA using an embodiment of the invention. In step 111, a first sequence of units (to hold an ISDF) and a second sequence of units (an SIF to hold the PPCs) are created, each of unspecified length, and the same FID is assigned to each sequence. The assembled first and second sequences will resemble the sequences shown in FIGS. 1B and 1C. In step 113, a strip count index SC is set equal to the specified number SB of PPCs. In step 115, the first PPC, or the next PPC in the ordered sequence of PPCs, is moved from the initial sequence (FIG. 1A) to that PPC's assigned place in the second sequence. A selected portion of this PPC (which may be the empty set for a particular PPC) is stored in a location, denoted as TK, for future use. The particular arrangement of bits or other information units stored in TK is referred to herein as the "content" of TK, written TK(c). A portion of this content TK(c) can also be used to determine one or more parameters for the encryption key EK.

In step 117, the strip count index SC is decremented by 1 (SC→SC−1). In step 119, the system examines the last unit in the particular component of the second sequence (PPCs) and determines if this last unit is an end-of-file unit (EOF=0). If the answer to the query in step 119 is "yes", the system sets an EOK flag equal to a selected value (e.g., EOK=1), in step 121, and the procedure terminates, at step 123.

If the answer to the query in step 119 is "no", the system determines if the strip count index satisfies SC≦0, in step 127. If the answer to the query in step 127 is "no", the system recycles to step 115 and the procedure continues. If the answer to the query in step 127 is "yes", the system initializes the strip count index to FB+TK(c1), in step 129, where TK(c1) is a selected subset of the content TK(c) held at the location TK. Use of a combination FB+TK(c1), with TK(c1) variable, allows the number of sub-cycles covered in the (following) steps 121 through 129 to be varied or "dithered" within the procedure.

In step 131, the system encrypts the first block, or the next consecutive block, in the first sequence of units (ISDF). In step 133, the system decrements the (new) strip count index SC (SC→SC−1). In step 135, the system determines if an EOF is present in this block. If the answer to the query in step 135 is "yes", the procedure terminates at step 137. If the answer to the query in step 135 is "no", the system determines if the (new) strip count index satisfies SC≦0, in step 139. If the answer to the query in step 139 is "no, the system recycles to step 131 and the procedure continues. If the answer to the query in step 139 is "yes", the system recycles to step 113 and the procedure continues.

Figure 6:
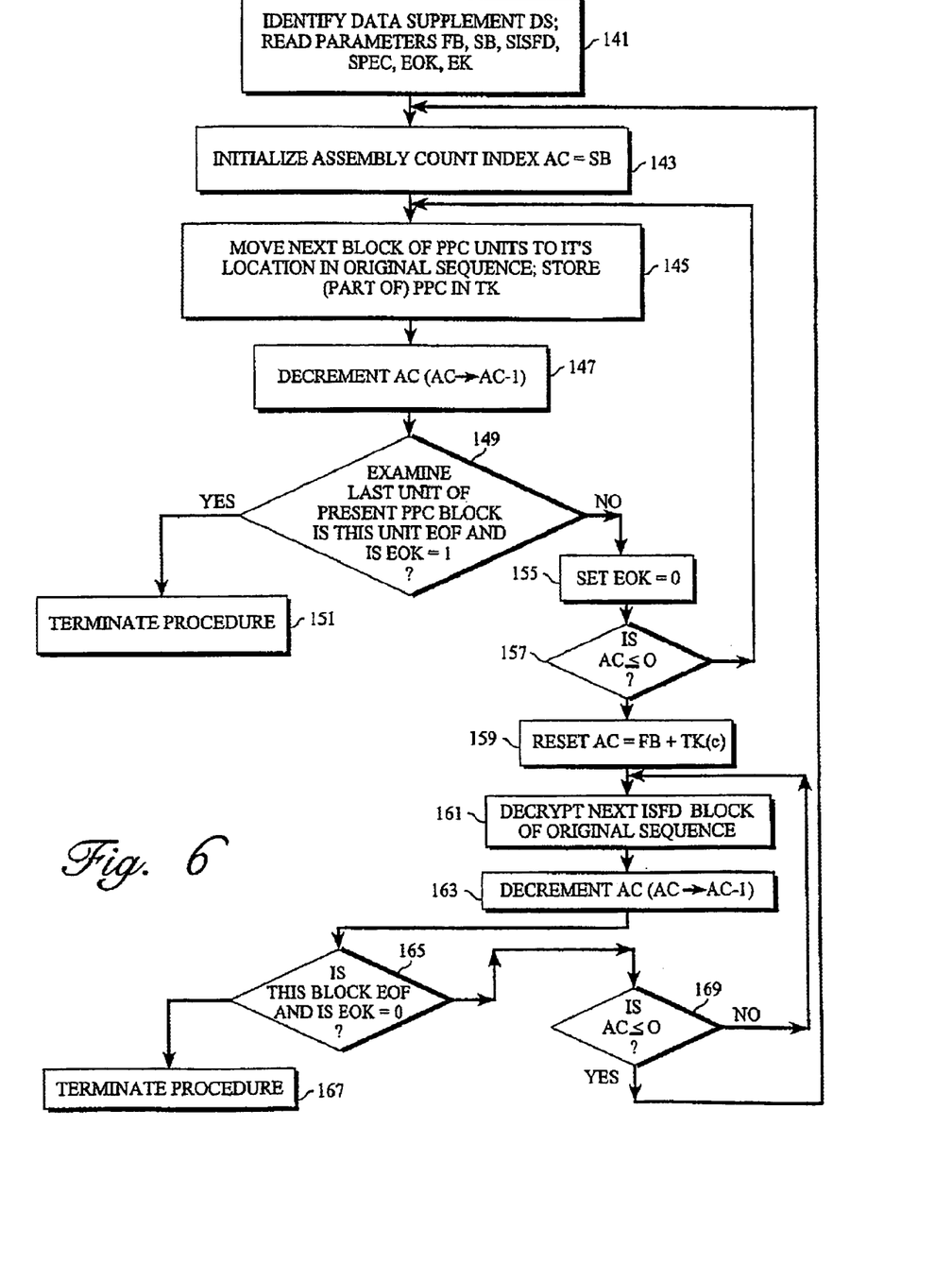

FIG. 6 is a flow chart illustrating a file assembly procedure that can be used with an embodiment of the invention. In step 141, the system identifies the data supplement DS and reads the parameters FB, KB, SISFD, SPPC, EOK and EK. In step 143, the system initializes an assembly count index, AC=SB. In step 145, the system moves the first block, or the next consecutive block, of the first sequence of units (PPC) to its proper location in the original sequence of units (specified by SB, FBS and KBS) and stores a selected portion of the PPC information (which may be the empty set) at a designated location TK. In step 147, the system decrements the assembly count index (AC→AC−1).

In step 149, the system examines the last unit in the particular component of the second sequence (PPCs) and determines (1) if this last unit is an end-of-file unit and (2) if EOK=1. If the answers to the compound query in step 149 are "yes" and "yes", the procedure terminates, at step 151. If the answer to one or both parts of the compound query in step 149 is "no", the system sets the EOK flag equal to another selected value (e.g., EOK=0), in step 155. In step 157, the system determines if the assembly count index satisfies AC≦0.

If the answer to the query in step 157 is "no", the system recycles to step 145 and the procedure continues. If the answer to the query in step 157 is "yes", the system resets an initial assembly count index, AC=FB+TK(c1), in step 159, where TK(c1) is a selected subset of the content TK(c). Again, use of a combination FB+TK(c1), with TK(c1) variable, allows the number of sub-cycles covered in the (following) steps 161 through 169 to be varied or "dithered" within the procedure.

In step 161, the system decrypts the next consecutive block of a reassembled original sequence. In step 163, the system decrements the (new) assembly count index (AC→AC−1). In step 165, the system examines the last unit in the particular component of the first sequence (ISDF) and determines (1) if this last unit is an end-of-file unit and (2) if EOK=0. If the answers to this compound query in step 165 are "yes" and "yes", the system terminates the procedure, at step 167. If the answer to one or both parts of the compound query in step 165 is "no", the system determines, at step 169, if the assembly count index AC satisfies AC≦0. If the answer to the query at step 169 is "no, the system recycles to step 161 and the procedure continues. If the answer to the query in step 169 is "yes", the system recycles to step 143 and the procedure continues.

In another embodiment, no PPCs are removed, and the entire file becomes an ISDF. No data supplement DS need be included, unless (part of) the encoding/encryption key EK is to be communicated with the encoded/encrypted version E(ISDF) or as part of an SIF. Otherwise, the SIF and the DS may be deleted in this embodiment. With reference to FIG. 4, steps 87, 93, 99 and/or 103 are optionally deleted in this embodiment. The file stripping algorithm, shown in FIG. 5, and the file assembly algorithm, shown in FIG. 6, are not used in this embodiment; this may also be implemented by formally setting FB=SB=0 in FIGS. 5 and 6.

The disclosed procedure relies primarily upon several features to provide secure communication of an ISA, as two or more sequences, where no combination of less than all the sequences will produce an assembly of sounds that adequately resemble the original ISA. First, portions of the message, the PPCs, are removed from the original ISA and are communicated separately, optionally using a secure channel. Second, the remainder of the ISA, the ISDF, is encrypted, using an encoding or encryption key that can vary in length and other characteristics from one block or component of the ISDF to another, as indicated in the discussion of FIGS. 5 and 6. Third, information in one or more of the PPCs can be used to determine one or more parameters in portions of the encoding or encryption key EK. Fourth, an augmented PPC sequence PPC+DS can also be encoded and/or encrypted before communication thereof.

Among other things, an unauthorized (or unlicensed) recipient of the encoded/encrypted version E(ISDF) and/or of the augmented PPC sequence PPC+DS would need to be aware of (1) the encoding or encryption key used to process the encoded/encrypted version E(ISDF) (and, optionally, used to encrypt the augmented PPC sequence PPC+DS), (2) the placement and meaning of ISDF, PPC and/or EK information contained in the data supplement DS, (3) the use of the information in the data supplement DS to reposition the PPCs within a decoded or decrypted ISDF, and (4) possible variation of the encoding/encryption key from one ISDF component to the next, in order to fully decode or decrypt an intercepted ISDF representing and ISA. The number of parameters and block-to-block variability incorporated in this system allows one to distribute or otherwise provide one or more, but less than all, of the sequences formed from the ISA, without making available any version that can be intelligibly played back. The missing sequence(s) from the ISA can be distributed to licensed or otherwise authorized "listeners", by another channel and/or at another time.

What is claimed is:

1. A method for delivering a digital sound file to an electronic device, the method comprising:

dividing the digital sound file into first and second data files, the first data file comprising the digital sound file having at least one segment removed from each of a plurality of locations within the digital sound file, and the second data file comprising the segments removed from each of a plurality of locations within the digital sound file;

encrypting at least a portion of the first data file using an encryption key;

communicating to the electronic device for persistent storage on the electronic device, a selected one of the first data file and the second data file; and communicating to another electronic device for delivery to the electronic device, the unselected one of the first and second data files, the delivery to the electronic device from the other electronic device being through a selected one of a) a removable storage medium and b) a data stream via a communications network.

2. The method of claim 1, wherein the digital sound file comprises a plurality of segments, and the dividing the digital sound file into first and second data files comprises:

removing a portion of the plurality of segments from the digital sound file;

storing the un-removed segments in the first data file; and storing the removed segments in the second data file.

3. The method of claim 2, wherein the second data file includes a data supplement that indicates:

location within the digital sound file of the removed segments, separation distance between two consecutive removed segments within the digital sound file, and a portion of the encryption key.

4. The method of claim 1, wherein the encryption key includes a key parameter that uses information from at least one of the removed segments.

5. A method for processing a digital sound file with a computing device, comprising:

receiving and persistently storing by the computing device, a selected one of a first data file and a second data file, the first data file comprising the digital sound file having at least one segment removed from a plurality of locations within the digital sound file, and the second data file comprising the at least one segment removed from the plurality of locations within the digital sound file, and at least a portion of the first data file having been encrypted;

receiving by the computing device, the unselected one of the first and second data files, via a selected one of a removable storage medium and a data stream;

decrypting the encrypted portion(s) of the first data file; and combining the decrypted first data file and the second data file to form the digital sound file.

6. The method of claim 5, wherein the second data file includes a data supplement that indicates:

location within the digital sound file of the removed segments, separation distance between two consecutive removed segments within the digital sound file, and a portion of an encryption key for decrypting the encrypted first data file.

7. The method of claim 6, wherein the first and second data files each include one or more segments, and combining the decrypted first data file and the second data file to form the digital sound file comprises:

using the data supplement to position the segments from the first and second data files into the digital sound file.

8. The method of claim 5, wherein decrypting the encrypted portion(s) of the first data file includes using a key, at least one parameter of the key is determined by the computing device from information in the second data file.

9. An article of manufacture comprising a computer-readable medium containing computer program code for delivering a digital sound file to a computing device, the computer program code comprising instructions for:

dividing the digital sound file into first and second data files, the first data file comprising the digital sound file having at least one segment removed from each of a plurality of locations within the digital sound file, and the second data file comprising the segments removed from each of a plurality of locations within the digital sound file;

encrypting at least a portion of the first data file using an encryption key;

communicating to the computing device for persistent storage on the computing device, a selected one of the first data file and the second data file; and communicating to another computing device for delivery to the computing device, the unselected one of the first and second data files, the delivery being through a selected one of a) a removable storage medium and b) a stream of data.

10. The article of claim 9, wherein the digital sound file comprises a plurality of segments, and the dividing the digital sound file into first and second data files comprises:

removing a portion of the plurality of segments from the digital sound file;

storing the un-removed segments in the first data file; and storing the removed segments in the second data file.

11. The article of claim 10, wherein the second data file includes a data supplement that indicates:

location within the digital sound file of the removed segments, separation distance between two consecutive removed segments within the digital sound file, and a portion of the encryption key.

12. The article of claim 9, wherein the encryption key includes a key parameter that uses information from at least one of the removed segments.

13. An article of manufacture comprising a computer-readable medium containing computer program code for a computing device to create a digital sound file, the computer program code comprising instructions for:

receiving and persistently storing by the computing device, a selected one of a first data file and a second data file, the first data file comprising the digital sound file having at least one segment removed from each of a plurality of locations within the digital sound file, the second data file comprising the segments removed from each of a plurality of locations within the digital sound file, and at least a portion of the first data file having been encrypted;

receiving by the computing device, via a selected one of a) a removable storage medium and b) a data stream, the unselected one of the first and second data files;

decrypting the encrypted portion(s) of first data file; and combining the decrypted first data file and the second data file to form the digital sound file.

14. The article of claim 13, wherein the second data file includes a data supplement that indicates:
   location within the digital sound file of the removed segments,
   separation distance between two consecutive removed segments within the digital sound file; and
   a portion of an encryption key for decrypting the encrypted first data file.

15. The article of claim 14, wherein the first and second data files each include one or more segments, and combining the first and second data files to form the digital sound file comprises:
   the computing device using the data supplement to position the segments from the first and second data files into the digital sound file.

16. The article of claim 13, wherein decrypting the encrypted first data file includes the computing device using a key, at least one parameter of the key determined from information in the second data file.

17. The article of claim 13, further comprising instructions for rendering the combined digital sound file.

18. The article of claim 13, further comprising instructions for storing on a non-persistent storage the received unselected one of the first and second data files.

19. A method for delivering a digital sound file to a computing device, the method comprising:
   dividing the digital sound file into first and second data files, the first data file comprising the digital sound file having at least one segment removed from each of a plurality of locations within the digital sound file, and the second data file comprising the segments removed from each of a plurality of locations within the digital sound file;
   encrypting at least a portion of the first data file using an encryption key;
   storing on a removable storage device, for delivery to the computing device, a selected one of the first data file and the second data file; and
   communicating to another computing device for streaming to the computing device, the unselected one of the first and second data files.

20. The method of claim 19, wherein the digital sound file comprises a plurality of segments, and the dividing the digital sound file into first and second data files comprises:
   removing a portion of the plurality of segments from the digital sound file;
   storing the un-removed segments in the first data file; and
   storing the removed segments in the second data file.

21. The method of claim 19, wherein the second data file includes a data supplement that indicates:
   location within the digital sound file of the removed segments,
   separation distance between two consecutive removed segments within the digital sound file, and
   a portion of the encryption key.

22. A method for creating a digital sound file by a computing device, comprising:
   receiving by the computing device, from a removable storage medium, a selected one of a first data file and a second data file, the first data file comprising the digital sound file having at least one segment removed from each of a plurality of locations within the digital sound file, the second data file comprising the segments removed from each of a plurality of locations within the digital sound file, and at least a portion of the first data file having been encrypted;
   receiving by the computing device, a data stream comprising the unselected one of the first and second data files;
   decrypting the encrypted portion(s) of the first data file; and
   combining the decrypted first data file and the second data file to form the digital sound file.

23. The method of claim 22, wherein the second data file includes a data supplement that indicates:
   location within the digital sound file of the removed segments,
   separation distance between two consecutive removed segments within the digital sound file, and
   a portion of an encryption key for decrypting the encrypted first data file.

24. The method of claim 22, wherein the first and second data files each include one or more segments, and combining the decrypted first data file and the second data file to form the digital sound file comprises:
   using the data supplement to position the segments from the first and second data files into the digital sound file.

25. The method of claim 22, wherein decrypting the encrypted portion(s) of first data file includes using a key, at least one parameter of the key is determined by the computing device from information in the second data file.

26. The method of claim 22 further comprising storing the selected and the unselected one of the first and second data files in persistent and non-persistent storage respectively.

27. An article of manufacture comprising a computer-readable medium containing computer program code for delivering a digital sound file to a computing device, the computer program code comprising instructions for:
   dividing the digital sound file into first and second data files, the first data file comprising the digital sound file having at least one segment removed from each of a plurality of locations within the digital sound file, and the second data file comprising the segments removed from each of a plurality of locations within the digital sound file;
   encrypting at least a portion of the first data file using an encryption key;
   storing on a removable storage device for provision to the computing device, a selected one of the first data file and the second data file; and
   communicating to another computing device for transmission via a data stream to the computing device, the unselected one of the first and second data files.

28. The article of claim 27, wherein the digital sound file comprises a plurality of segments, and the dividing the digital sound file into first and second data files comprises:
   removing a portion of the plurality of segments from the digital sound file;
   storing the un-removed segments in the first data file; and
   storing the removed segments in the second data file.

29. The article of claim 28, wherein the second data file includes a data supplement that indicates:
   location within the digital sound file of the removed segments,
   separation distance between two consecutive removed segments within the digital sound file, and
   a portion of the encryption key.

30. The article of claim 27, wherein the encryption key includes a key parameter that uses information from at least one of the removed segments.

31. An article of manufacture comprising a computer-readable medium containing computer program code for a computing device to create a digital sound file, the computer program code comprising instructions for:

receiving by the computing device, from a removable storage medium, a selected one of a first data file and a second data file, the first data file comprising the digital sound file having at least one segment removed from each of a plurality of locations within the digital sound file, the second data file comprising the segments removed from each of a plurality of locations within the digital sound file, and the first data file having at least a portion encrypted;

receiving with the computing device, a stream of video data comprising the unselected one of the first and second data files;

decrypting the encrypted portion(s) of the first data file; and combining the decrypted first data file and the second data file to form the digital sound file.

32. The article of claim 31, wherein the second data file includes a data supplement that indicates:

location within the digital sound file of the removed segments, separation distance between two consecutive removed segments within the digital sound file; and a portion of an encryption key for decrypting the encrypted first data file.

33. The article of claim 32, wherein the first and second data files each include one or more segments, and combining the decrypted first data file and the second data files to form the digital sound file comprises:

the computing device using the data supplement to position the segments from the first and second data files into the digital sound file.

34. The article of claim 31, wherein decrypting the encrypted portion(s) of the first data file includes the computing device using a key, at least one parameter of the key determined from information in the second data file.

35. The article of claim 31 further comprising instructions for storing the selected and the unselected one of the first and second data files in persistent and non-persistent storage respectively.

* * * * *

UNITED STATES PATENT AND TRADEMARK OFFICE
CERTIFICATE OF CORRECTION

| | | |
|---|---|---|
| PATENT NO. | : 7,099,848 B1 | Page 1 of 1 |
| APPLICATION NO. | : 09/505486 | |
| DATED | : August 29, 2006 | |
| INVENTOR(S) | : Timothy R. Bratton | |

It is certified that error appears in the above-identified patent and that said Letters Patent is hereby corrected as shown below:

On the title page item (54), and col. 1, line 1,
The title reading "AUDIO DELIVERY AND RENDERING METHOD AND APPARATUS" should read --AUDIO SYNTHESIS USING DIGITAL SAMPLING OF CODED WAVEFORMS--

Col. 2, line 25, "MDI" should be changed to --MIDI--.

Signed and Sealed this

Seventh Day of April, 2009

JOHN DOLL
*Acting Director of the United States Patent and Trademark Office*